United States Patent
Lefevere et al.

(10) Patent No.: US 7,463,772 B1
(45) Date of Patent: *Dec. 9, 2008

(54) DE-WARPING OF SCANNED IMAGES

(75) Inventors: Francois-Marie Lefevere, Mountain View, CA (US); Marin Saric, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 10/938,502

(22) Filed: Sep. 13, 2004

(51) Int. Cl.
*G06K 9/62* (2006.01)

(52) U.S. Cl. .................. 382/215; 382/276; 382/285; 358/488; 358/530; 345/419; 348/E13.002; 348/E13.003

(58) Field of Classification Search ............... 382/100, 382/131, 294, 215, 285, 154, 293, 276, 128; 358/474, 497, 488, 471, 493, 530, 400; 715/209, 715/274; 600/407, 426; 345/427, 419, 421, 345/422, 418; 250/208.1, 226; 356/402; 355/25, 23; 399/361, 362; 348/E13.025, 348/E13.003, E13.002, E13.001; 707/E17.11; 378/23
See application file for complete search history.

(56) References Cited

U.S. PATENT DOCUMENTS

| | | | | | |
|---|---|---|---|---|---|
| 5,362,958 | A | * | 11/1994 | Ando | 250/208.1 |
| 5,886,342 | A | * | 3/1999 | Matsui | 250/208.1 |
| 5,969,829 | A | * | 10/1999 | Matsuda et al. | 358/475 |
| 5,995,245 | A | * | 11/1999 | Moro | 358/474 |
| 6,014,470 | A | * | 1/2000 | Matsuda | 382/275 |
| 6,940,664 | B1 | * | 9/2005 | Pilu | 359/806 |
| 6,996,290 | B2 | * | 2/2006 | Cariffe | 382/275 |
| 7,072,527 | B1 | * | 7/2006 | Nako | 382/290 |

* cited by examiner

*Primary Examiner*—Sheela C Chawan
(74) *Attorney, Agent, or Firm*—Harrity & Harrity, LLP

(57) ABSTRACT

A system includes a stereoscopic camera to generate images of a document, such as a book, that can be converted to a three-dimensional contour of the document. A second camera take a two-dimensional image of the document. A model is generated that defines a mapping between the three-dimensional contour of the document and a two-dimensional flattened (de-warped) version of the document. The model may be applied to the two-dimensional image taken by the second camera to compensate for warping in the image.

27 Claims, 13 Drawing Sheets

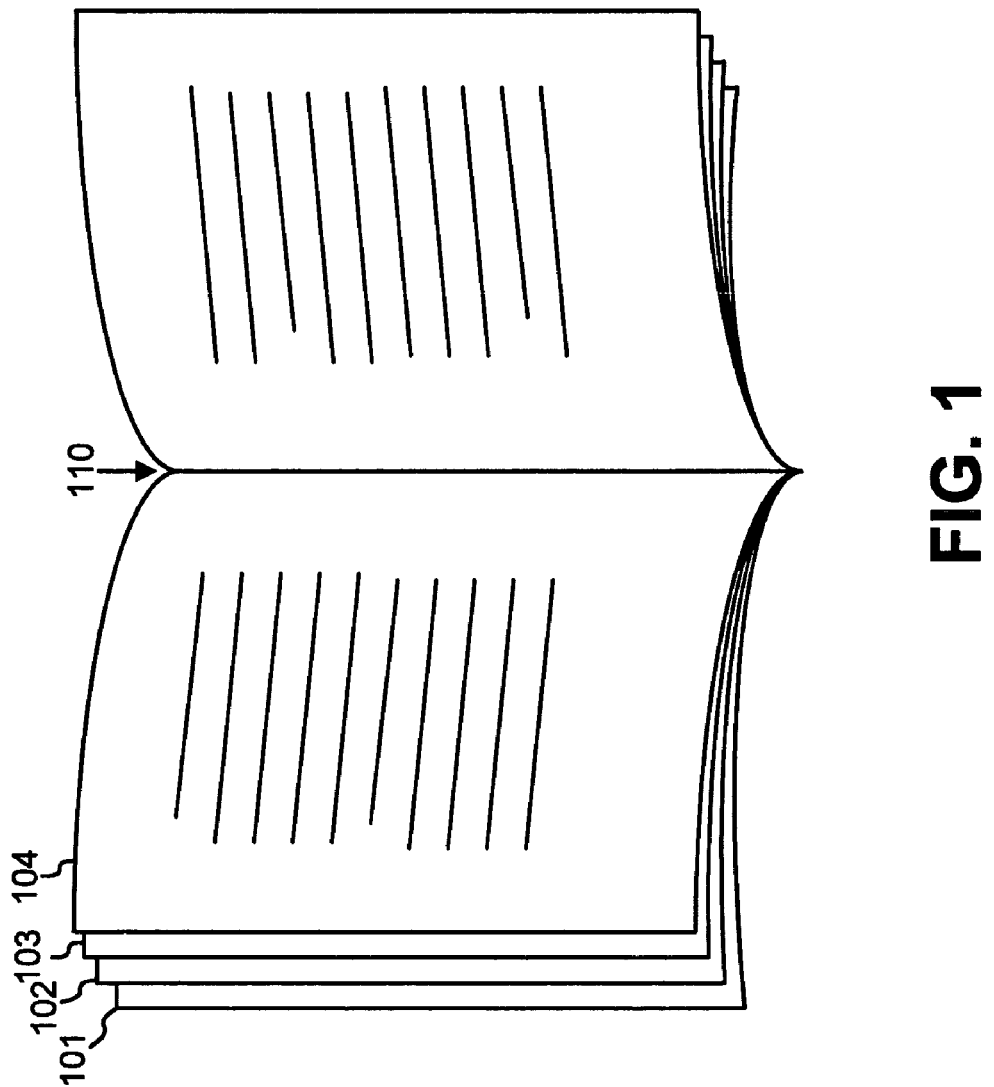

TEXT
WARPING

FIG. 2A

TEXT
WARPING

FIG. 2B

DE-WARPING OF SCANNED IMAGES

BACKGROUND

A. Field of the Invention

Systems and methods described herein relate to image scanning and, more particularly, to techniques for scanning and removing distortions in documents.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

One problem with using OCR in the context of printed documents such as books is that books are generally bound in a manner that can make it difficult to generate high quality images of the pages. For OCR, it is desirable to generate the images of the printed pages from flat, two-dimensional, versions of the pages. Books generally have spines, however, that can cause the pages to have a more three-dimensional profile. The three-dimensional profile of the page, when viewed as a two-dimensional image, will exhibit distortion ("warping") of the printed text. This warping can reduce the accuracy of the text file output by the OCR system.

SUMMARY OF THE INVENTION

According to one aspect, a system includes a stereoscopic camera to generate images of a page of the document on the platform from which a three-dimensional image of a surface of the page of the document is generated. The system further includes a second camera to take a two-dimensional image of the page of the document and control logic to process the three-dimensional image and the two-dimensional image.

According to a second aspect, a computer-implemented method is recited for generating a model that describes a three-dimensional profile of a surface of a document relative to a two-dimensional un-warped profile of the surface. The method includes locating a first line in a three-dimensional image of the surface of the document and fitting a next line in the three-dimensional image of the surface at a predetermined distance from the first line. The method further includes determining a two-dimensional line corresponding to the next line in the two-dimensional un-warped profile of the surface and storing the model, in a computer-readable medium, as a set of corresponding fitted next lines in the three-dimensional image of the surface and determined two-dimensional lines.

According to another aspect, a computer-implemented method is recited for generating a model that describes a three-dimensional profile of a surface of a document relative to a two-dimensional un-warped profile of the surface. The method includes generating a first series of equations for a first set of points in a three-dimensional image of the surface of the document and the two-dimensional un-warped profile of the surface of the document that define stretching of the document between the first set of points. The method further includes generating a second series of equations for a second set of points in the three-dimensional image of the surface of the document and the two-dimensional un-warped profile of the surface of the document that define a shearing of the document between the second set of points. The method further includes minimizing the stretching and shearing of the document defined by the first and second series of equations.

According to yet another aspect, a method compensates for distortion in a two-dimensional image of a document. The method includes processing a three-dimensional image of a contour of a surface of the document to obtain a model relating the three-dimensional contour of the surface to a flat two-dimensional contour of the surface of the document. The method further includes projecting the two-dimensional image to a three-dimensional image based on the three-dimensional contour of the surface and re-projecting the projected three-dimensional image to a second two-dimensional image based on the model.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram illustrating an exemplary book that may be subject to warping when scanned;

FIGS. 2A and 2B are diagrams illustrating exemplary text (FIG. 2A) and a warped version of the text (FIG. 2B);

DETAILED DESCRIPTION

The following detailed description of the invention refers to the accompanying drawings. The detailed description does not limit the invention.

Overview

FIG. 1 is a diagram illustrating a book 100 that may be subject to warping when scanned. Pages 101-104 of book 100 emanate from a central groove 110 that is defined by the spine of the book. Page 104 is shown as the opened-to left page of the book. In contrast to a page of paper placed flat on a surface, page 104 includes a three-dimensional profile.

Figures 2A, 2B:
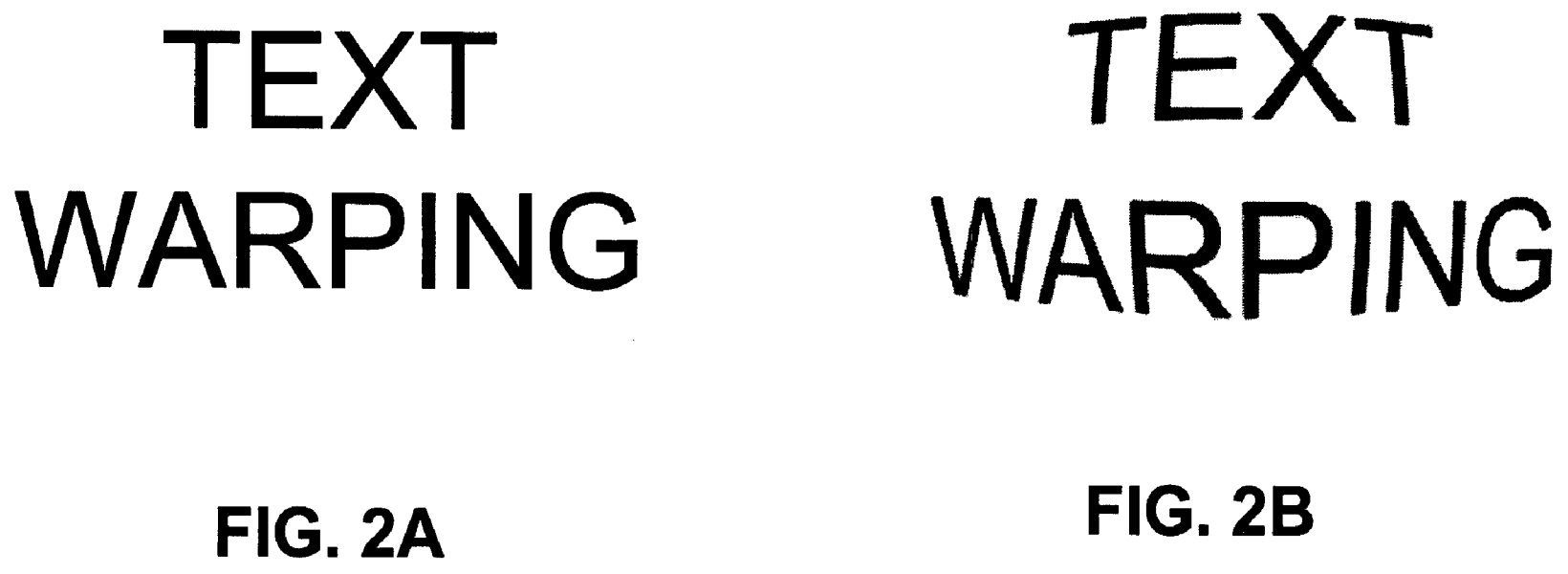

FIGS. 2A and 2B are diagrams illustrating exemplary text (FIG. 2A) and a warped version of the text (FIG. 2B). The text in FIG. 2A may be thought of as text that is scanned from a flat page that is laid on a flat surface. The warped text in FIG. 2B, however, can be thought of as being caused by a scanning process in which the same page was not flat relative to the scanning system. Specifically, the warping shown in FIG. 2B, which is particularly acute in the center of the text, may have been caused by the center portion of the page having a "bulge" relative to the scanner.

Although the image of the text in FIG. 2A will generally be recognized by OCR conversion software, the image of the text of FIG. 2B may tend to cause conversion errors. That is, conversion software operating on the image of the text of FIG. 2B may result in a string of textual characters other than "text warping."

Consistent with aspects of the invention, a system may generate a model that describes the three-dimensional profile of a page relative to a flat (de-warped) two-dimensional image of the page. The model can be used to "de-warp" a two-dimensional image of the page.

Figure 3:
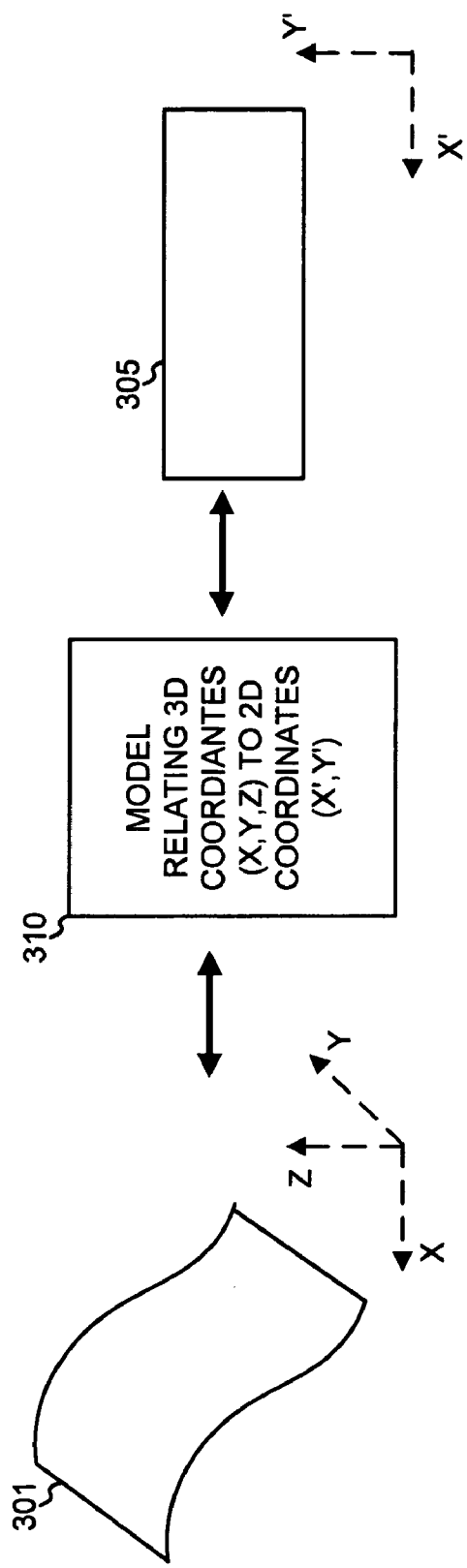
FIG. 3 is a diagram that conceptually illustrates de-warping a two-dimensional image of a page based on a three-dimensional model.

FIG. 3 is a diagram that conceptually illustrates de-warping a two-dimensional image of a page based on a three-dimensional model. Model 310 relates the three-dimensional surface of a page 301 to an ideal, non-warped two-dimensional version 305 of the page. A two-dimensional image of the page may also be taken, which may include images that are warped due to the true three-dimensional surface of the page. For example, the warped-version of "text warping" (FIG. 2B) may correspond to this two-dimensional image. Model 310 may be applied to the warped image to obtain an un-warped version of the image (e.g., FIG. 2A). The un-warped version may be more effectively processed by OCR software.

System Overview

Figure 4:
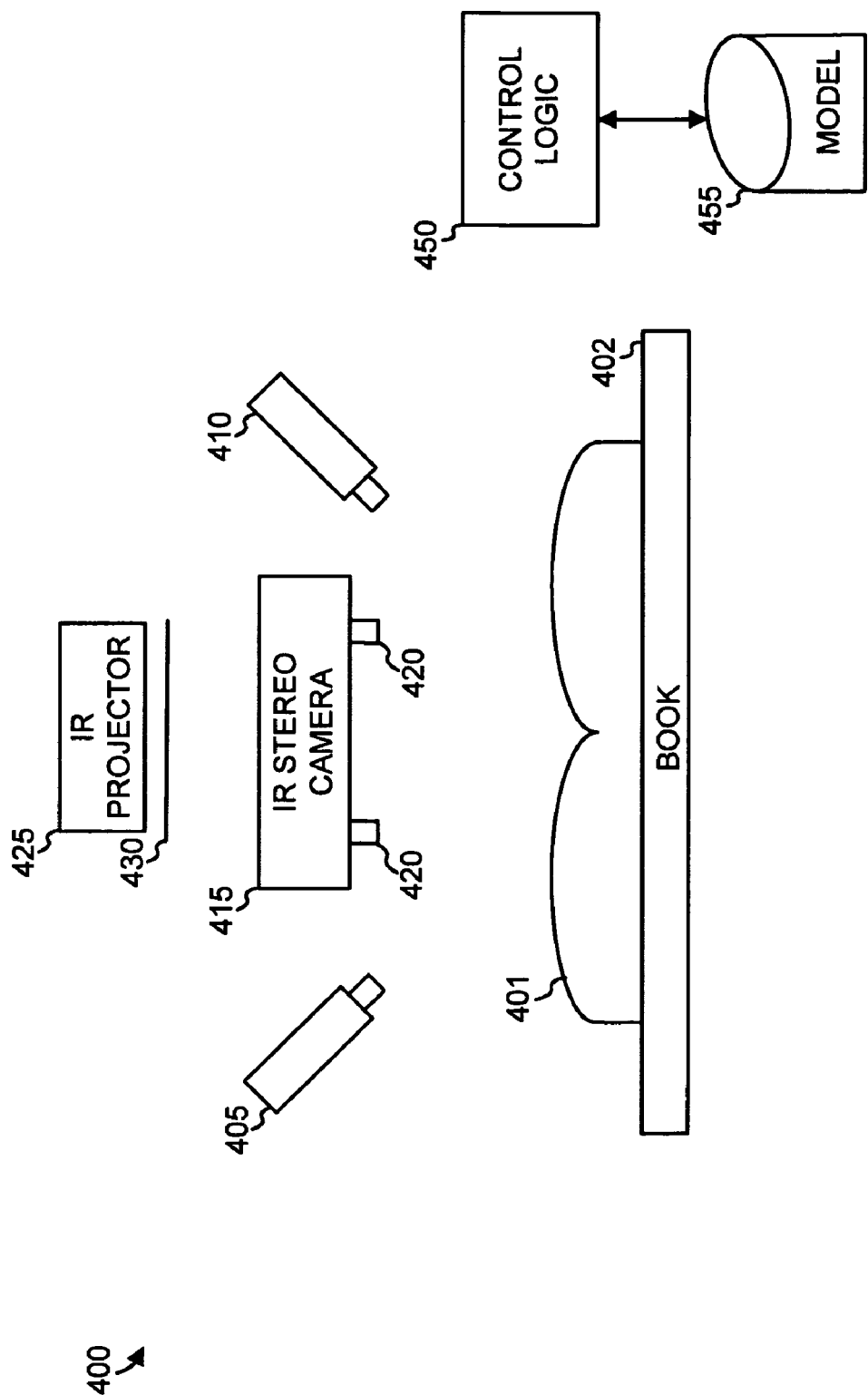
FIG. 4 is a diagram illustrating an exemplary system for optically scanning documents to obtain images of the documents.

FIG. 4 is a diagram illustrating an exemplary system 400 for optically scanning documents, such as books, to obtain images of the documents. System 400 may include cameras 405 and 410 for taking two-dimensional images of a book 401 resting on a platform 402. Documents other than books, such as, for example, magazines or other documents for which it is difficult to generate a flat un-warped image, may also be processed. An infra-red (IR) stereo camera 415 may include multiple imaging lenses 420. An IR projector 425 may project IR radiation through a pattern mask 430 onto book 401. Control logic 450 may control the operation of system 400. For example, control logic 450 may control cameras 405, 410, and 415, and receive and process images taken by these cameras. Based on this information, control logic 450 may generate model 455. Model 455 relates the three-dimensional surface of document 401 to an ideal, non-warped two-dimensional image of the surface of document 401.

Cameras 405 and 410 may be high definition cameras. In some implementations, only one of cameras 405 and 410 may be used. In other implementations, additional cameras similar to cameras 405 and 410 may be used.

IR stereo camera 415, by virtue of its multiple imaging lenses 420, can take multiple images of book 401, each from different viewpoints. The images may be set to be taken in the IR spectrum. IR projector 425 may project IR radiation through pattern mask 430 onto book 401. Thus, IR stereo camera 415 may take a stereoscopic image of the pattern defined by pattern mask 430. The pattern may then be detected in the resulting image. In one implementation, the pattern may include a pattern that resembles a maze. Because the relative positions of imaging lenses 420 are known, the images can be stereoscopically combined (by, for example, control logic 450), using known stereoscopic techniques, to obtain a three-dimensional mapping of the pattern. The pattern falls on the surface of book 401, causing the three-dimensional mapping of the pattern to correspond to the three-dimensional surface of the page of the book.

Instead of an IR projector 425 and a stereo camera 405, a projector and camera that projects using radiation other than IR could be used. In general, the projector and stereo camera may use any frequency that is not visible in the image taken by high definition cameras 405 and 410.

Figure 5:
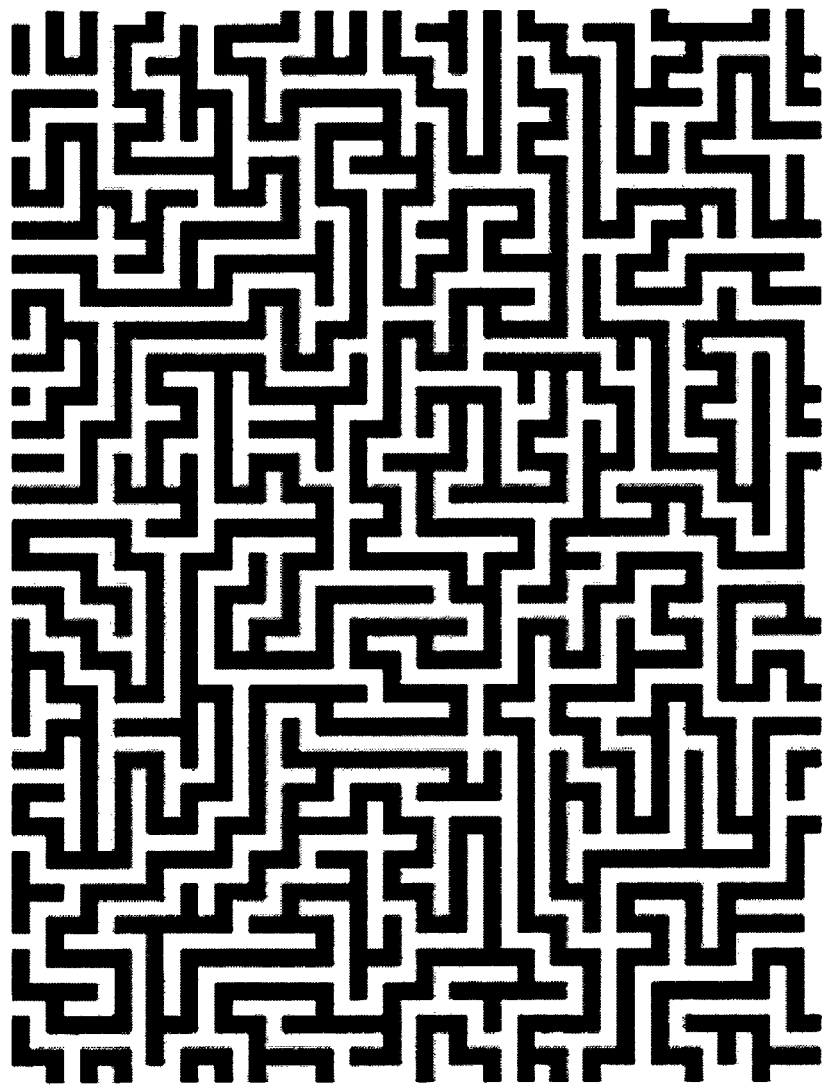
FIG. 5 is a diagram illustrating an exemplary portion of a pattern.

FIG. 5 is a diagram illustrating an exemplary portion of a pattern. The pattern may be superimposed on the surface of a three-dimensional page. Control logic 450 may detect and record the three-dimensional position of the pattern, which may be used to define the surface of a page 510 in three-dimensional space.

Figure 6:
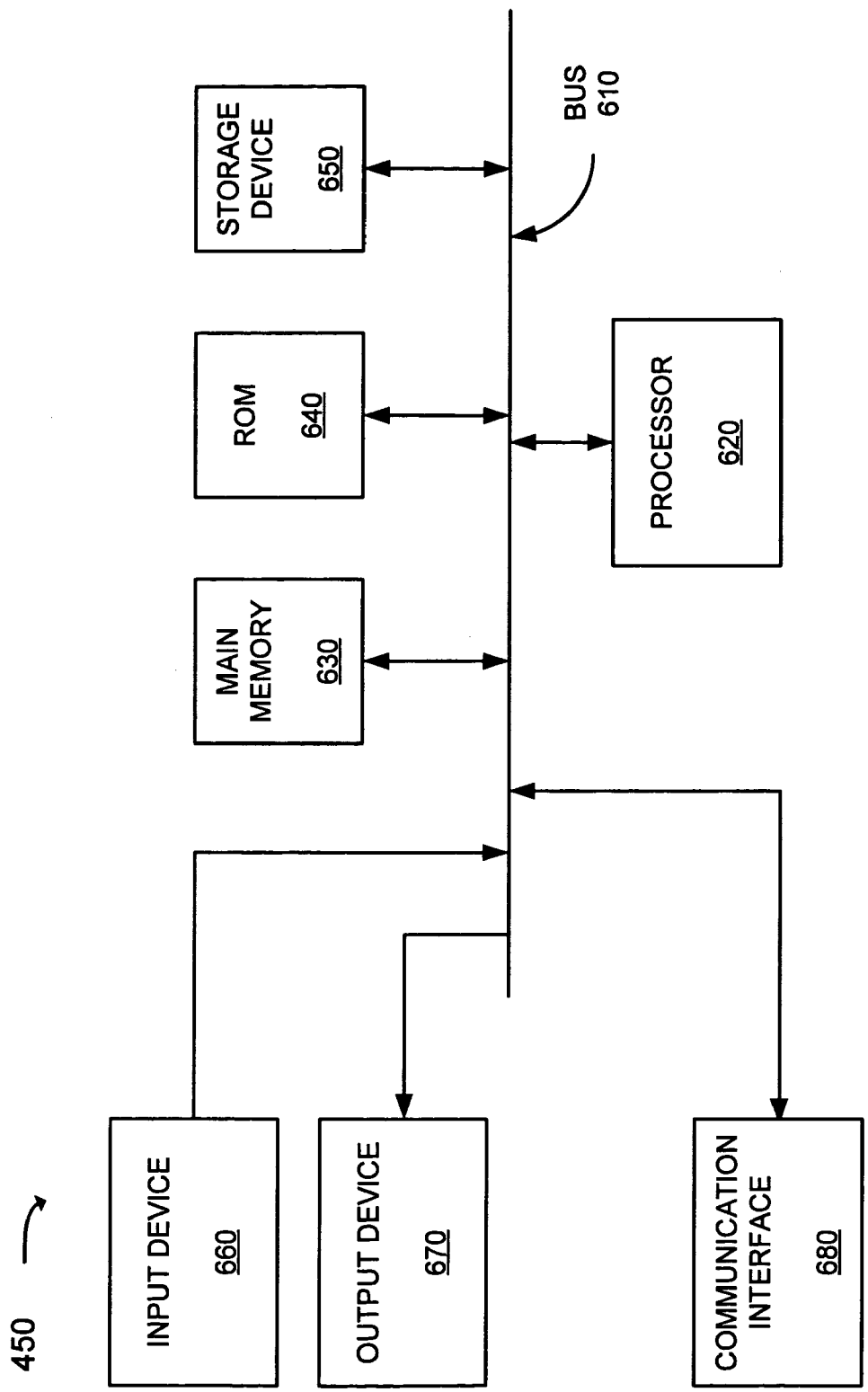
FIG. 6 is a diagram illustrating an exemplary implementation of the control logic shown in FIG. 4.

FIG. 6 is a diagram illustrating an exemplary implementation of control logic 450. Control logic 450 may include a bus 610, a processor 620, a main memory 630, a read only memory (ROM) 640, a storage device 650, an input device 660, an output device 670, and a communication interface 680. Bus 610 may include a path that permits communication among the components of control logic 450.

Processor 620 may include a conventional processor, microprocessor, or processing logic that interprets and executes instructions. Main memory 630 may include a random access memory (RAM) or another type of dynamic storage device that stores information and instructions for execution by processor 620. ROM 640 may include a conventional ROM device or another type of static storage device that stores static information and instructions for use by processor 620. Storage device 650 may include a magnetic and/or optical recording medium and its corresponding drive.

Input device 660 may include a conventional mechanism that permits a user to input information to control logic 450, such as a keyboard, a mouse, a pen, voice recognition and/or a biometric mechanism, etc. Output device 670 may include a conventional mechanism that outputs information to the user, including a display, a printer, a speaker, etc. Communication interface 680 may include any transceiver-like mechanism that enables control logic 450 to communicate with other devices and/or systems.

System Operation

Figure 7:
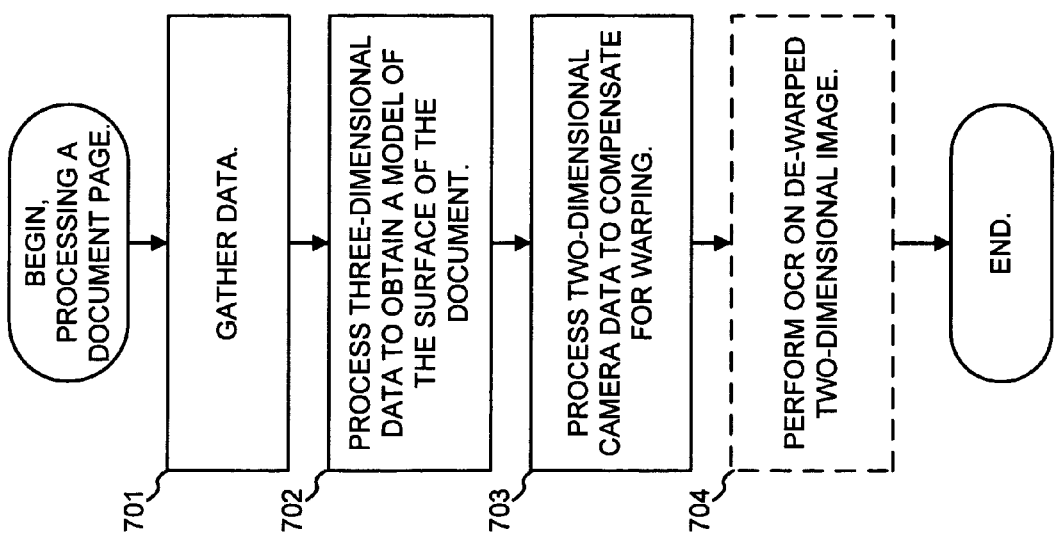
FIG. 7 is a flowchart illustrating exemplary operations of the system shown in FIG. 4 in processing a page of a document.

FIG. 7 is a flowchart illustrating exemplary operations of system 400 in processing a page of a document.

System 400 may begin by gathering data (act 701). The gathered data may include high definition two-dimensional images taken by cameras 410 and 405 and stereo images taken by IR stereo camera 415. As previously mentioned, the stereo images include a predetermined pattern created by transmitting IR radiation from IR projector 425 through pattern mask 430 and onto the surface of the open pages in the document. The data gathered in act 701 may be saved to a computer-readable medium, and in the case of the stereo images, may be processed to match the pattern in at least two of the stereo images in order to recover the three-dimensional position of each pixel (point) in the image.

The three-dimensional image data gathered from IR stereo camera 415 may next be processed to obtain model 455, which relates the three-dimensional surface of the page to the two-dimensional coordinate of a flat, de-warped version of the page (act 702). Thus, the model may define a three-dimensional/two-dimensional mapping for the page of the document. For example, the model may be implemented as pairs of corresponding two-dimensional/three-dimensional coordinate values, such as a pair of values corresponding to every object in the pattern. In general, the model should define the three-dimensional surface of the page and a mapping from the three-dimensional to the two-dimensional surface. Techniques to obtain model 455 are described in more detail below.

The two-dimensional camera data from one or both of cameras 405 and 410 may then be processed based on the model to compensate for warping in the two-dimensional image (act 703). More particularly, the two-dimensional images from camera 405 and 410 may be projected to three-dimensional coordinate space based on the three-dimensional coordinate space obtained from IR stereo camera 415 and then re-projected back to two-dimensional coordinate space using the two-dimensional/three-dimensional mapping defined by model 455.

Figure 8:
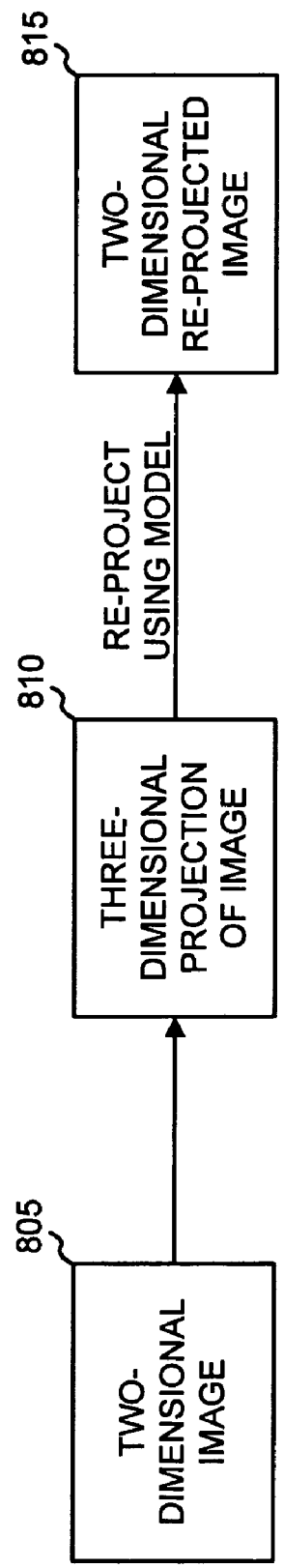
FIG. 8 is a diagram conceptually illustrating compensating for warping based on a model.

FIG. 8 is a diagram conceptually illustrating the operations performed in act 703. As shown, a two-dimensional image from camera(s) 405/410 (block 805) is projected to a three-dimensional image space (block 810) and then re-projected back to a two-dimensional image (block 815) based on the mappings defined by model 455.

The de-warped versions of the two-dimensional images that were obtained in act 703 may then be processed by OCR software to identify the characters in the images (act 704). In other implementations, when only a de-warped two-dimensional image is needed, OCR conversion of the image to characters may not be necessary and this would not be performed.

Exemplary Model Generation

Figure 9:
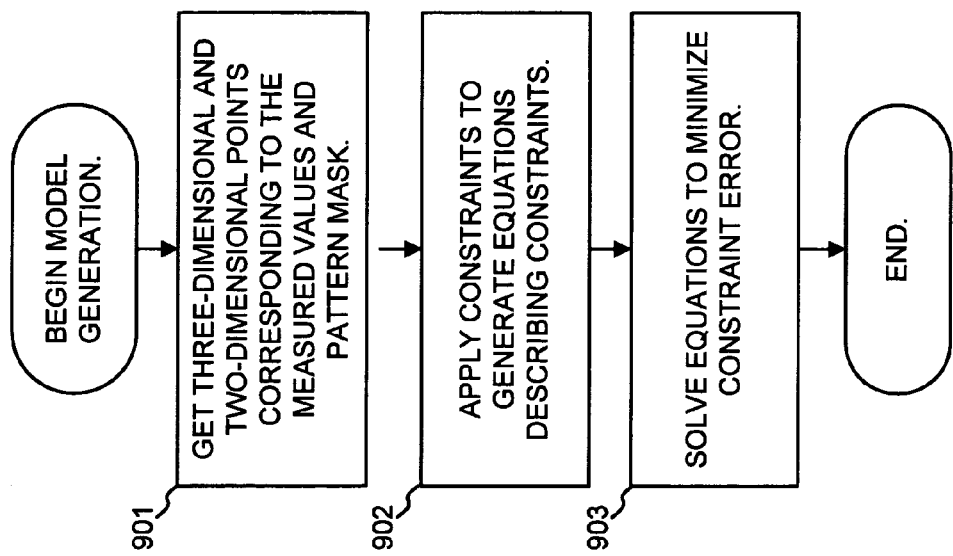
FIG. 9 is a flow chart illustrating one implementation for processing three-dimensional data to obtain a model.

FIG. 9 is a flow chart illustrating one implementation for processing the three-dimensional data to obtain model 455, as performed in act 702 (FIG. 7). In one implementation, model 455 may be generated for each page or pair of pages of the document.

Figure 10:
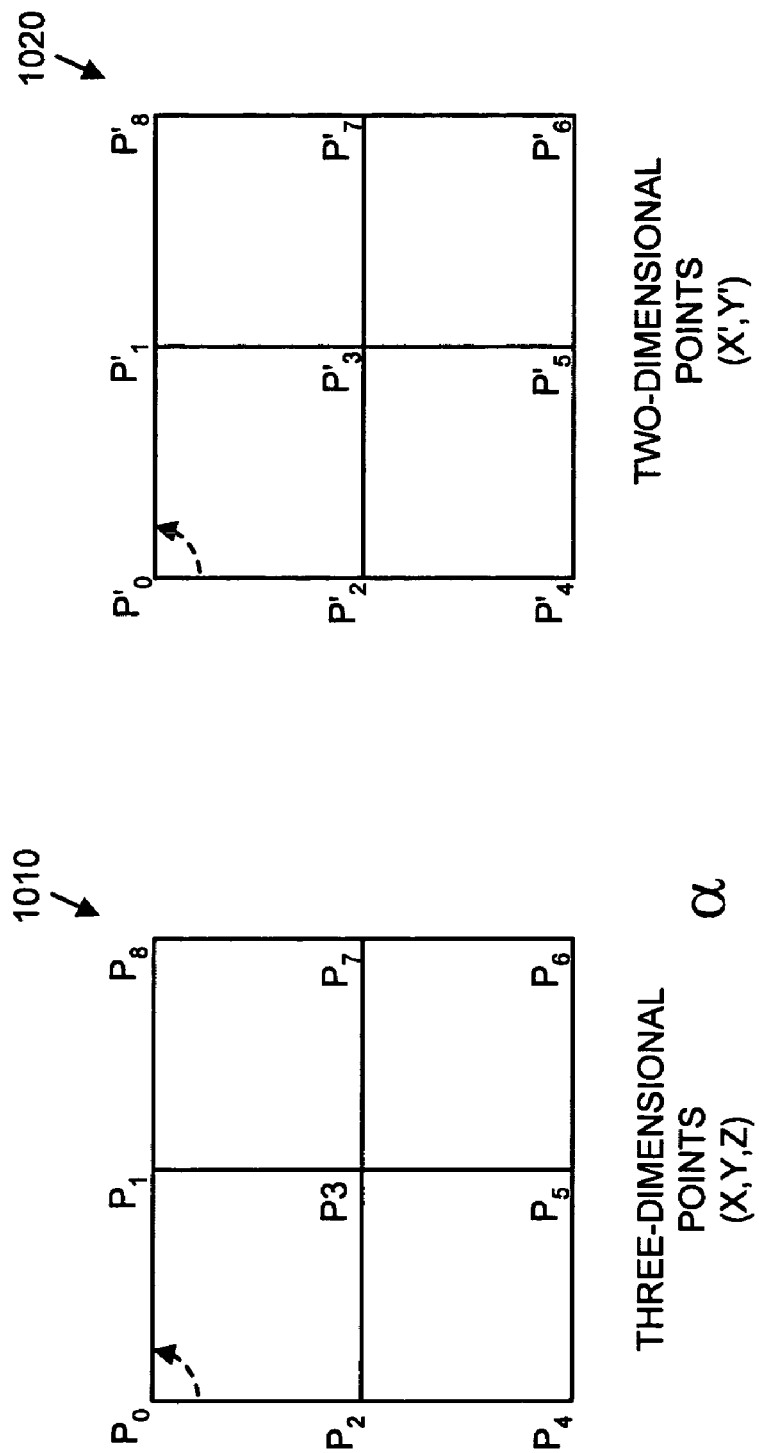
FIG. 10 is a diagram conceptually illustrating selected operations shown in FIG. 9.

The three-dimensional mapping of the pattern that corresponds to the surface of the document may be initially retrieved and processed to generate the correspondence of the three-dimensional points to the known flat two-dimensional pattern (act 901). This concept is shown in FIG. 10, in which an exemplary set of nine three-dimensional points 1010 are illustrated along with their corresponding nine two-dimensional points 1020. Three-dimensional points 1010 correspond to nine points from the pattern that are located in three-dimensions based on images from IR stereo camera 415. Points 1010 are labeled as points $P_0$ through $P_8$ and are each associated with a three-dimensional coordinate vector (e.g., (X, Y, Z)). Points 1020 are labeled as points $P'_0$ through $P'_8$ and are each associated with a two-dimensional coordinate vector (e.g., (X', Y')).

Measurement and calibration errors may introduce errors into values of points 1010 and 1020. To minimize these errors, constraints are applied that can be used to generate equations that describe the constraints (act 902). In one implementation, two constraints may be applied: stretch and shear. The stretch constraint assumes the page is not stretched. This implies that distances between two points in three-dimensional space should be equal to the distance in two-dimensional space. This constraint can be expressed, for any two points, such as points $P_0$ and $P_1$ in FIG. 10, as:

$$[(P_0-P_1)^2-(P'_0-P'_1)^2]^2. \quad (eq. 1)$$

The shear constraint assumes that the angle $\alpha$ is equal to the angle $\alpha'$ (FIG. 10). This constraint can be expressed, for the points $P_0$, $P_1$, and $P_2$ as:

$$[(P_0-P_1)\cdot(P_2-P_0)-(P'_0-P'_1)\cdot(P'_2-P'_0)] \quad (eq. 2)$$

where · represents the dot product. If there is no stretching, equation (1) will equal zero for any corresponding pair of points. Similarly, if there is no shearing and no stretching, equation (2) will be zero.

Equations (1) and (2) may be generated for all or a subset of the pairs, or triplets in the case of equation (2), of points in the three-dimensional image taken by stereo camera 415. The equations may then be solved to minimize the total stretch and shear error (act 903). In other words, the correspondence between the three-dimensional values and the two-dimensional values, illustrated in FIG. 10, may be adjusted based on the system of equations defined by the stretch and shear constraints. The final correspondence between the three-dimensional/two-dimensional points defines model 455.

Figure 11:
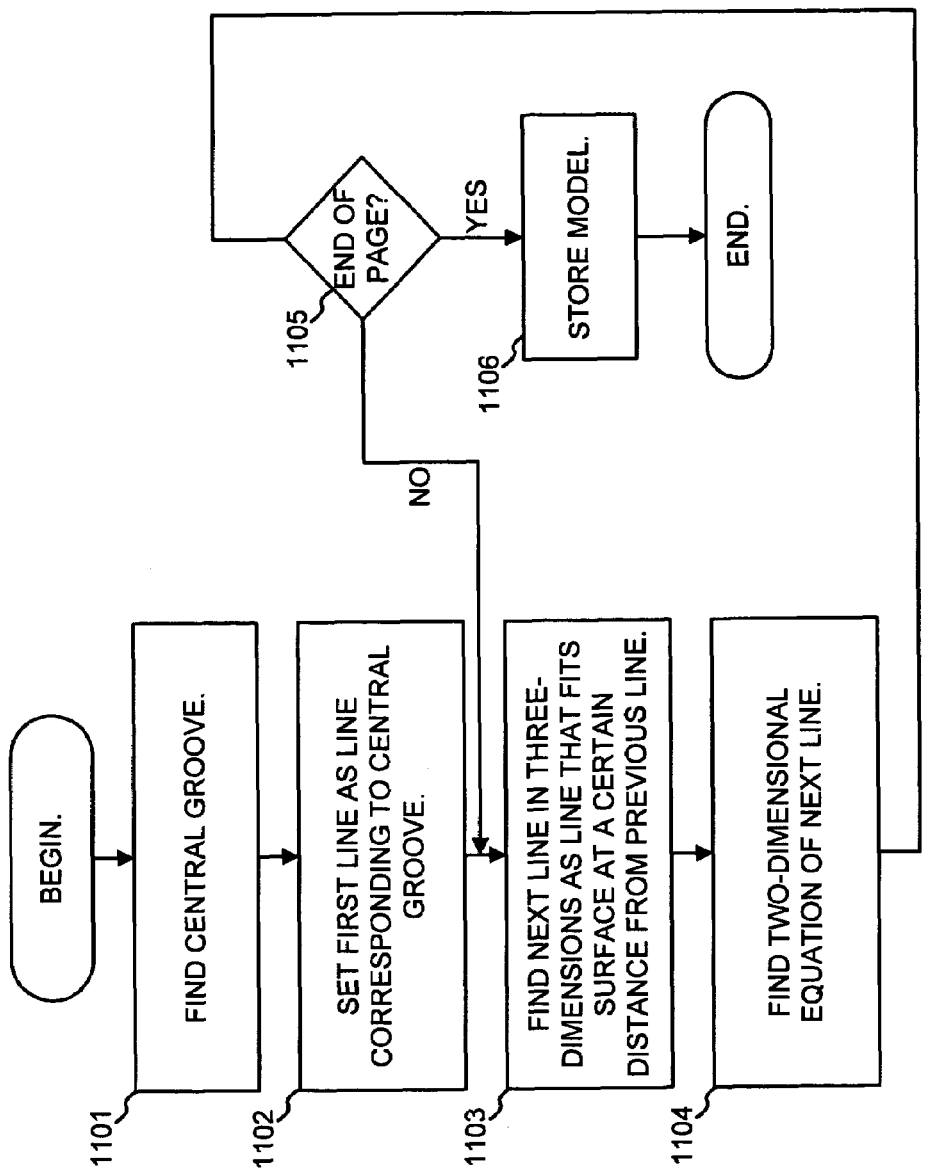
FIG. 11 is a flow chart illustrating a second implementation for processing the three-dimensional data to obtain a model.

FIG. 11 is a flow chart illustrating a second implementation for processing the three-dimensional data to obtain model 455, as performed in act 702 (FIG. 7). Model 455 may be generated for each page or pair of pages of the document.

Figure 12:
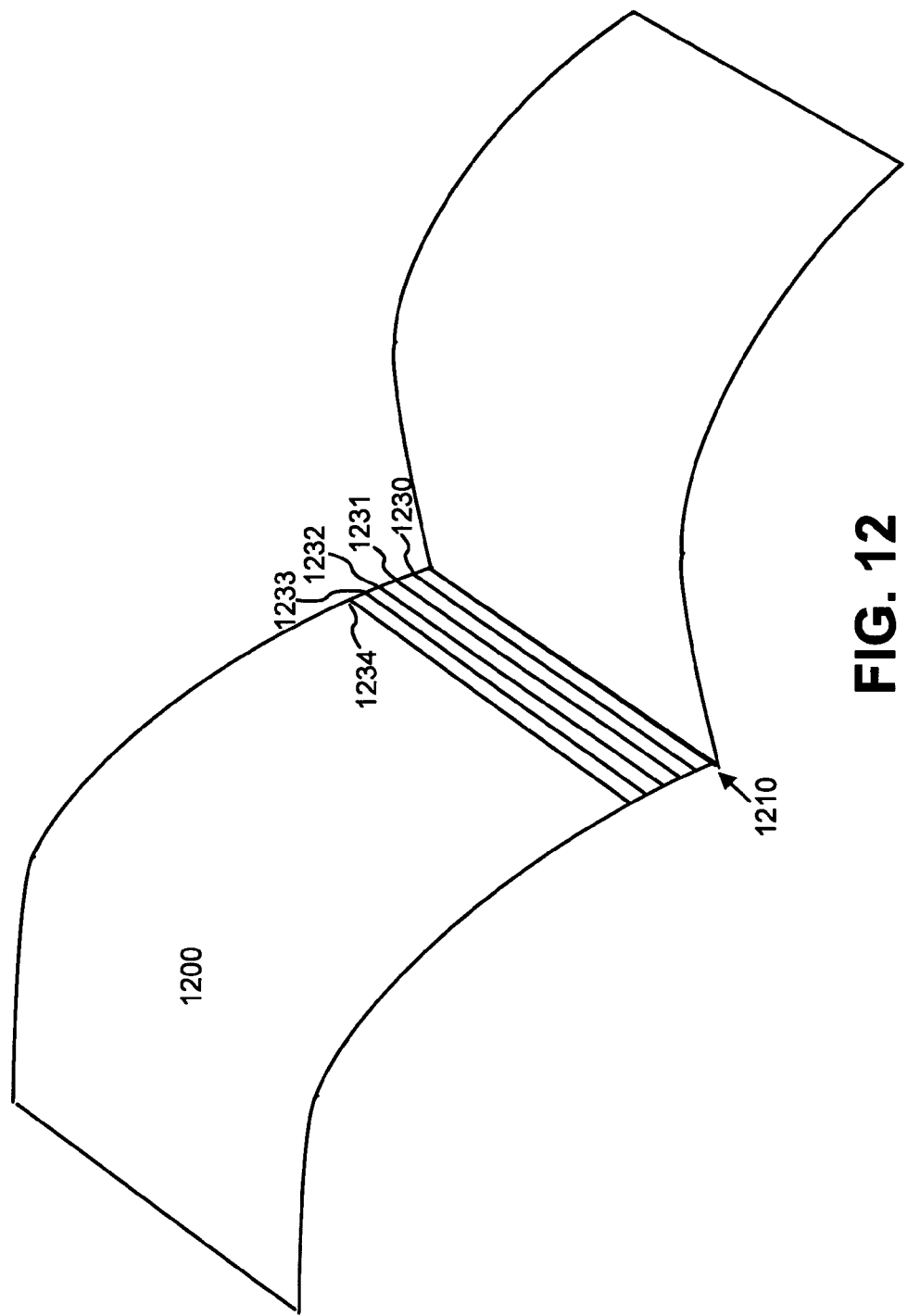
FIG. 12 is a diagram illustrating an exemplary three-dimensional page of a document.

Control logic 450, or other logic in system 400, may begin by finding the central groove for a document (act 1101). For a book, the central groove is generally the line centered on the spine of the book. FIG. 12 is a diagram illustrating an exemplary three-dimensional page 1200 of a book. A central groove is illustrated in FIG. 12 as central groove 1210. The central groove may be detected in a variety of automated or manually ways. For example, an operator may manually specify the location of the central groove. Alternatively, the central groove may be automatically detected by searching for a line in the three-dimensional image that lies in the lowest "valley" in the image.

Model 455 is generally based on a series of lines that may each be determined by moving a predetermined distance from the previous line along the surface of the page. A series of such lines are indicated in FIG. 12 as lines 1230-1234. While lines 1230-1234 are shown as parallel to each other, this may not be the case due to the three-dimensional nature of page 1200.

The first line may be the three-dimensional line corresponding to central groove 1210 (act 1102). The next line may then be located by finding a best-fit three-dimensional line that is a predetermined distance, such as 1 millimeter, from the previous line, along the surface of the page (act 1103). The best-fit three-dimensional line may be fitted to the three-dimensional points that define the surface of a page. More particularly, in performing act 1103, the surface of the page in the vicinity of the current line may be estimated using for example, a relatively simple model for a curve, such as a quadratic surface. For example, for page 1200, the surface of the page in the vicinity of the current line may be identified and curve-fitted.

The corresponding two-dimensional equation of the next line may then be determined (act 1104). In one implementation, the two-dimensional equation of the next line is determined by locating a plane that best passes through the next line and the previous line, and then using the two-dimensional equation of the previous line and the plane to find the two-dimensional equation of the next line. Acts 1103 and 1104 may be repeated until the end of the page is reached (act 1105).

As an example of the application of acts 1103-1105, consider page 1200 and assume central groove 1210 has been located and determined to be the previous line. The three-dimensional representation of line 1230 may next be located as the line that best fits the surface around lines 1210 and 1230 and that is located approximately 1 mm from line 1210. A plane may next be projected through lines 1210 and 1230, and the two-dimensional equation of line 1210 and the plane may be used to generate the two-dimensional equation of line 1230. This process may be repeated for line 1231 with line 1230 set as the previous line and then repeated until page 1200 is "covered" by a series of three-dimensional lines that map to two-dimensional lines.

Model 455 may then be stored as the corresponding pairs of two-dimensional and three-dimensional mappings defined by the pairs of two-dimensional and three-dimensional lines (act 1106).

Exemplary System Operation

Figure 13:
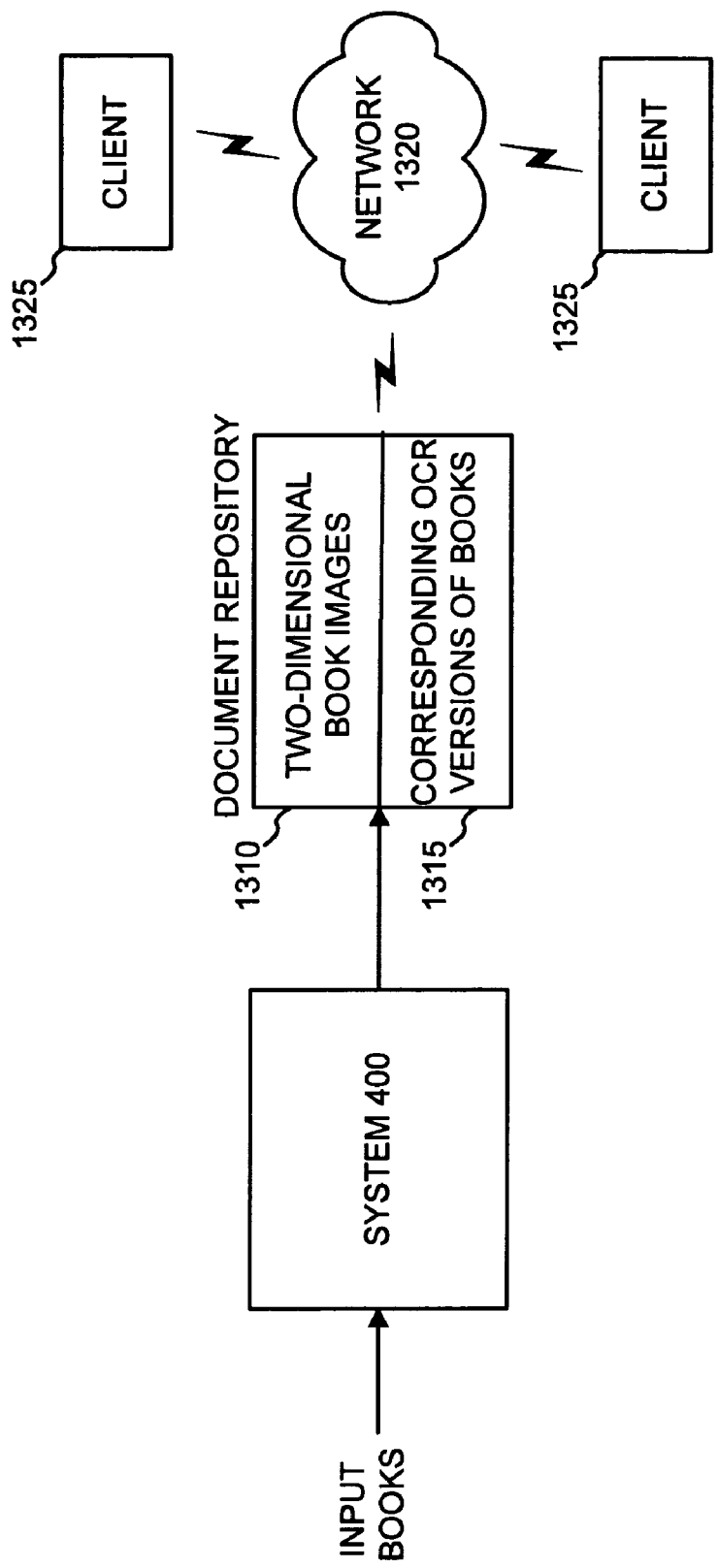
FIG. 13 is a diagram illustrating an exemplary application relating to de-warping documents.

FIG. 13 is a diagram illustrating one exemplary application of the concepts described herein relating to de-warping documents. Books may be scanned using a system such as that shown in FIG. 4. For example, an operator may turn each page of the current book and instruct system 400 to scan and process each page as described above. The resulting data may be stored in a document repository as de-warped two-dimensional page images and as corresponding OCR textual data. The textual data allows clients 1325, for example, to perform keyword-based searches on the scanned books through a network 1320. One or both of the OCR textual data and the images of the pages may then be returned to clients 1325 as search results.

CONCLUSION

Techniques for scanning and de-warping scanned versions of documents were described above. The scanning may involve using a stereoscopic camera system to generate a three-dimensional representation of the open pages. A model relating the three-dimensional scanned image space with an un-warped two-dimensional image space can then be generated. In one implementation, a series of simultaneous equations generated from page constraints were solved to generate the model. In another implementation, a series of three-dimensional lines were fitted to the surface of the page and successive mappings to a series of two-dimensional lines were derived to generate the model.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed is:

1. A system comprising:
an infrared projector to project infrared radiation in an output path toward a page of a document; a pattern mask located in the output path of the infrared projector;
an infrared stereoscopic camera to generate images of the page of the document from which a three-dimensional image of a surface of the page of the document is generated a second camera to generate a two-dimensional image of the page of the document; and
control logic to process the three-dimensional image and the two-dimensional image and to generate a model that relates the three-dimensional image of the surface of the page of the document to a flat, un-warped two-dimensional image of the page.

2. The system of claim 1, wherein the control logic processes the three-dimensional image and the two-dimensional image by using the three-dimensional image to determine warping that occurs on the page of the document.

3. The system of claim 2, wherein the control logic further corrects for the determined warping in the two-dimensional image of the page of the document.

4. The system of claim 1, wherein the second camera includes:
first and second cameras.

5. The system of claim 1, wherein the second camera is a high definition camera.

6. The system of claim 1, wherein the infrared stereoscopic camera includes two lenses configured to take stereoscopic images.

7. The system of claim 1, wherein the infrared projector projects infrared radiation visible to the infrared stereoscopic camera and not visible to the second camera.

8. The system of claim 1, wherein the control logic generates a model that relates the three-dimensional image of the surface of the page of the document to a flat, un-warped two-dimensional image of the page.

9. The system of claim 8, wherein the model is based on a page model in which the page is constrained to not shear or stretch.

10. The system of claim 8, wherein the model is generated by sequentially fitting a series of three-dimensional lines along a surface of the page and mapping the series of three-dimensional lines to a corresponding series of two-dimensional lines.

11. The system of claim 1, further comprising:
a platform for supporting the document.

12. A method comprising:
generating a model, that describes a three-dimensional profile of a surface of a document relative to a two-dimensional un-warped profile of the surface by:

locating with an infrared stereoscopic camera a first set of lines in a three-dimensional image of the surface of the document; and determining two-dimensional lines corresponding to the first set of lines in the two-dimensional un-warped profile of the surface; and storing the model, in a computer-readable medium, as the first set of three-dimensional lines in the three-dimensional image of the surface and the corresponding determined two-dimensional lines.

13. The method of claim 12, wherein locating the first set of lines includes:

fitting a next line in the three-dimensional image of the surface at a predetermined distance from a previous line.

14. The method of claim 13, wherein fitting the next line and determining the two-dimensional line are repeated until an end of the surface of the document is reached.

15. The method of claim 13, wherein fitting the next line further includes:

estimating a three-dimensional curve that describes a surface of the document in a local vicinity of the next line.

16. The method of claim 13, wherein determining the two-dimensional line further includes:

locating a plane that best passes through the next line and the previous line; and determining the two-dimensional line based on the plane.

17. The method of claim 12, wherein a first line of the three-dimensional lines is a groove defined by a spine of the document.

18. A device comprising:

means for sensing infrared radiation to locate a first line in a three-dimensional image of a surface of a document;

means for fitting a next line in the three-dimensional image of the surface at a predetermined distance from the first line;

means for determining a two-dimensional line equation corresponding to the next line in a two-dimensional profile of the surface; and means for storing a model that includes a plurality of fitted next lines and the corresponding two-dimensional line equations, the model describing a three-dimensional profile of a surface of the document relative to a two-dimensional un-warped surface of the document.

19. The device of claim 18, wherein the two-dimensional profile is determined from a pattern projected onto the surface of the document.

20. A method comprising:

generating a model, that describes a three-dimensional profile of a surface of a document relative to a two-dimensional un-warped profile of the surface by:

generating a first series of equations for a first set of points in a three-dimensional image of the surface of the document and the two-dimensional un-warped profile of the surface of the document that define stretching of the document between the first set of points;

generating a second series of equations for a second set of points in the three-dimensional image of the surface of the document and the two-dimensional un-warped profile of the surface of the document that define a shearing of the document between the second set of points; and minimizing the stretching and shearing of the document defined by the first and second series of equations; and storing the model, in a computer-readable medium, based on the second set of points minimized for stretching and shearing.

21. The method of claim 20, wherein the two-dimensional profile is determined from a known image pattern projected onto the surface of the document.

22. A method of compensating for distortion in a two-dimensional image of a document, the method comprising:

gathering a three-dimensional image of a contour of a surface of the document by detecting non-visible infrared radiation;

processing the three-dimensional image of the contour of the surface of the document to obtain a model relating the three-dimensional contour of the surface to a flat two-dimensional contour of the surface of the document;

projecting the two-dimensional image to a three-dimensional image based on the three-dimensional contour of the surface; and re-projecting the projected three-dimensional image to a second two-dimensional image based on the model, where the second two-dimensional image is compensated for distortion.

23. The method of claim 22, further comprising:

projecting an infrared pattern onto the surface of the document.

24. The method of claim 22, further comprising:

performing optical character recognition (OCR) on the second two-dimensional image.

25. The method of claim 22, wherein processing the three-dimensional image of a contour of a surface of the document to obtain the model comprises:

sequentially fitting a series of three-dimensional lines along the surface of the document, and mapping the series of three-dimensional lines to a corresponding series of two-dimensional lines.

26. The method of claim 22, wherein processing the three-dimensional image of a contour of a surface of the document to obtain the model comprises:

constraining the three-dimensional contour of the surface to the flat two-dimensional contour of the surface such that stretch and shear between the contours is minimized.

27. A method of compensating for distortion in a two-dimensional image of a document, the method comprising:

gathering three-dimensional image data of a contour of a surface of the document from an infrared stereoscopic camera;

processing the three-dimensional image data to obtain a model relating the three-dimensional contour of the surface to a flat two-dimensional contour of the surface of the document, the model being generated by sequentially fitting a series of three-dimensional lines along a surface of the document and mapping the series of three-dimensional lines to a corresponding series of two-dimensional lines;

projecting the two-dimensional image to a three-dimensional image based on the three-dimensional contour of the surface; and re-projecting the projected three-dimensional image to a second two-dimensional image based on the model, whereby the second two-dimensional image is compensated for distortion.

* * * * *